(12) United States Patent
Solhusvik et al.

(10) Patent No.: US 9,438,866 B2
(45) Date of Patent: Sep. 6, 2016

(54) IMAGE SENSOR WITH SCALED FILTER ARRAY AND IN-PIXEL BINNING

(71) Applicant: OMNIVISION TECHNOLOGIES, INC., Santa Clara, CA (US)

(72) Inventors: Johannes Solhusvik, Haslum (NO); Per Olaf Pahr, Gullaug (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 163 days.

(21) Appl. No.: 14/259,567

(22) Filed: Apr. 23, 2014

(65) Prior Publication Data

US 2015/0312537 A1 Oct. 29, 2015

(51) Int. Cl.
*H04N 5/235* (2006.01)
*H04N 5/335* (2011.01)
*H04N 9/083* (2006.01)
*H04N 9/04* (2006.01)
*H04N 5/343* (2011.01)
*H04N 5/345* (2011.01)
*H04N 5/347* (2011.01)
*H04N 5/3745* (2011.01)

(52) U.S. Cl.
CPC ............. *H04N 9/045* (2013.01); *H04N 5/343* (2013.01); *H04N 5/347* (2013.01); *H04N 5/3458* (2013.01); *H04N 5/37457* (2013.01); *H04N 2209/045* (2013.01)

(58) Field of Classification Search
None
See application file for complete search history.

(56) References Cited

U.S. PATENT DOCUMENTS

| 6,501,484 | B1 * | 12/2002 | Porter | ........................ | G06T 3/40 345/667 |
| 2008/0129834 | A1 | 6/2008 | Dosluoglu | | |
| 2010/0026865 | A1 | 2/2010 | Tivarus et al. | | |
| 2011/0101205 | A1 * | 5/2011 | Tian | ........................ | H04N 5/332 250/208.1 |
| 2012/0188355 | A1 * | 7/2012 | Omi | ..................... | A61B 5/0077 348/78 |
| 2012/0193515 | A1 * | 8/2012 | Agranov | ................. | G01S 3/782 250/208.1 |

OTHER PUBLICATIONS

TW Application No. 103124981—First Taiwanese Office Action and Search Report with English Translation, mailed Jan. 12, 2016, 15 pages.

* cited by examiner

*Primary Examiner* — Aung S Moe
*Assistant Examiner* — Euel Cowan
(74) *Attorney, Agent, or Firm* — Blakely Sokoloff Taylor & Zafman LLP

(57) ABSTRACT

Embodiments of an apparatus including a pixel array including a plurality of individual pixels grouped into pixel kernels having two or more individual pixels, wherein each pixel kernel includes a floating diffusion electrically coupled to all individual pixels in the kernel. A color filter array (CFA) is positioned over and optically coupled to the pixel array, the CFA comprising a plurality of tiled minimal repeating units, each including a plurality of scaled filters having a photoresponse selected from among two or more different photoresponses. Individual pixels within each pixel kernel are optically coupled to a scaled filter. Circuitry and logic coupled to the pixel array cause the apparatus to operate in a first mode wherein signals from a subset of individual pixels are individually transferred to their floating diffusion and read, resulting in a high-resolution, low-sensitivity sub-image and a second mode wherein signals from individual pixels in every pixel kernel are binned into the kernel's floating diffusion and read, resulting in a low-resolution, high-sensitivity image.

26 Claims, 9 Drawing Sheets

IMAGE SENSOR WITH SCALED FILTER ARRAY AND IN-PIXEL BINNING

TECHNICAL FIELD

The disclosed embodiments relate generally to image sensors and in particular, but not exclusively, to image sensors including scaled filter arrays and in-pixel binning.

BACKGROUND

Analog or digital binning, in which several pixel values are combined into one, is a technique used to capture low-light scenes. In image sensors with Bayer-pattern color filters, binning can cause color artifacts due to aliasing. Also, it is difficult to do in-pixel binning (charge sharing onto a floating diffusion (FD) node) because in existing image sensors pixels of the same color are not placed next to each other.

BRIEF DESCRIPTION OF THE DRAWINGS

Non-limiting and non-exhaustive embodiments are described with reference to the following figures, wherein like reference numerals refer to like parts throughout the various views unless otherwise specified.

FIGS. 5A-5C are plan views of embodiments of minimal repeating units including scaled filters.

DETAILED DESCRIPTION OF THE ILLUSTRATED EMBODIMENTS

Embodiments are described of an apparatus, system, and method for image sensors including scaled filter arrays and in-pixel binning. Specific details are described to provide a thorough understanding of the embodiments, but one skilled in the relevant art will recognize that the embodiments can be practiced without one or more of the described details, or with other methods, components, materials, etc. In some instances, well-known structures, materials, or operations are not shown or described in detail but are nonetheless encompassed within the scope of the invention.

Reference throughout this specification to "one embodiment" or "an embodiment" means that a described feature, structure, or characteristic can be included in at least one described embodiment, so that appearances of "in one embodiment" or "in an embodiment" do not necessarily all refer to the same embodiment. Furthermore, the particular features, structures, or characteristics may be combined in any suitable manner in one or more embodiments.

Some machine-vision applications, such as automotive applications, need increased pixel resolution for recognition of objects (e.g., traffic signs) at larger distances. Another constraint is that the optical format must remain unchanged. Thus, pixel size must be reduced, which unfortunately results in lower light sensitivity caused by smaller pixel area, lower quantum efficiency and higher crosstalk. The disclosed embodiments seek to maximize light sensitivity by using larger color filters covering more than one pixel per color, and by using charge-domain binning on the floating diffusion (FD) node. The area of each individual color filter is scaled to substantially match that of a cluster or kernel of shared pixels. The illustrated shared pixel architecture enables charge-sharing onto a common floating diffusion (FD) node. Such a combination of scaled color filter array (CFA) pattern and shared pixels maximizes signal/noise ratio. The disclosed embodiments are suitable for next generation automotive imagers where increased resolution (smaller pixels) is a requirement. It will meet customers' expectations when operating in binning mode where the light sensitivity should be equal or better compared to the current generation large-pixel sensors.

Figure 1:
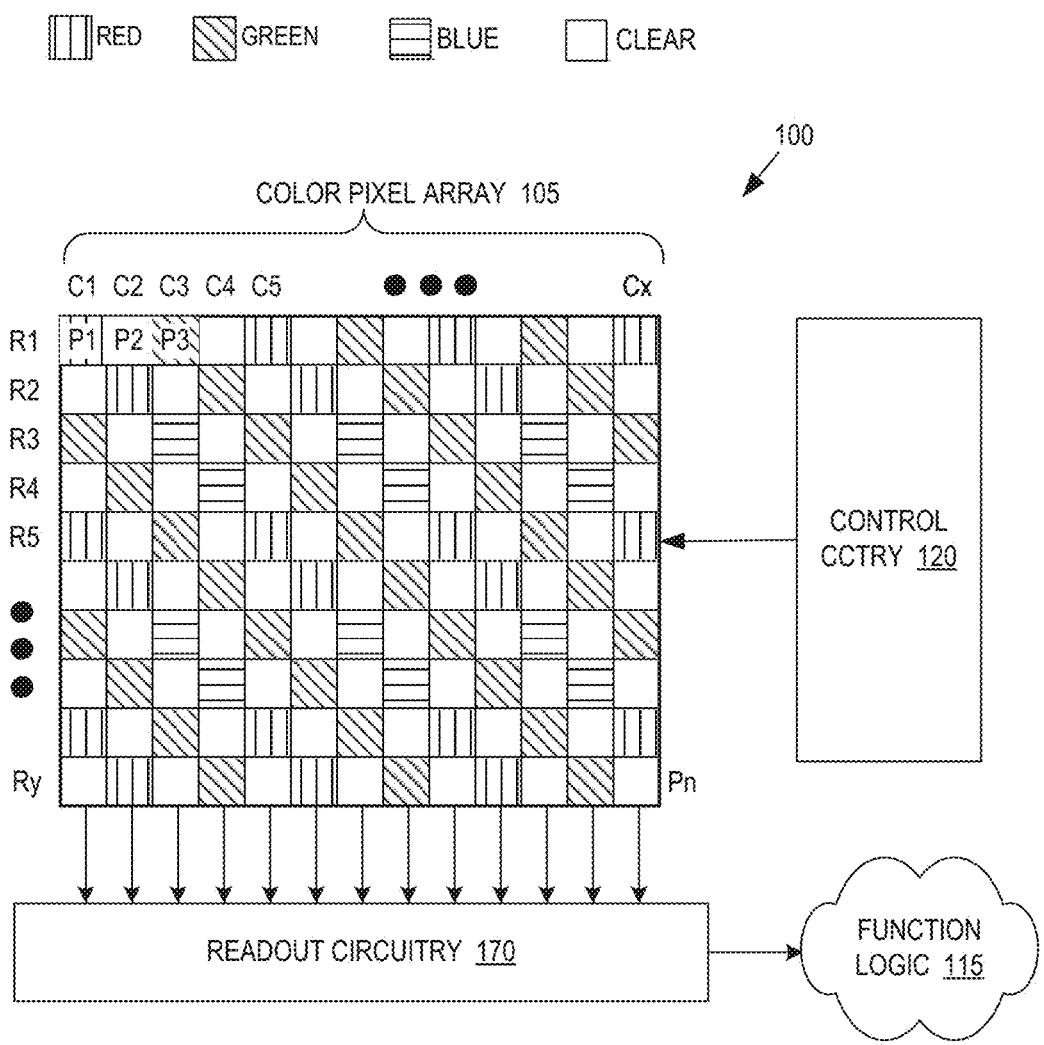
FIG. 1 is a schematic of an embodiment of an image sensor including a color filter array.

FIG. 1 illustrates an embodiment of a CMOS image sensor 100 including a color pixel array 105, readout circuitry 170 coupled to the pixel array, function logic 115 coupled to the readout circuitry, and control circuitry 120 coupled to the pixel array. Pixel array 105 is a two-dimensional ("2D") array of individual imaging sensors or pixels (e.g., pixels P1, P2 . . . , Pn) having X pixel columns and Y pixel rows. Each pixel is arranged into a row (e.g., rows R1 to Ry) and a column (e.g., column C1 to Cx) to acquire image data of a person, place, or object, which can then be used to render a 2D image of the person, place, or object. Pixel array 105 can be implemented as a frontside-illuminated (FSI) or backside-illuminated (BSI) pixel array including any of the pixel kernel configurations and scaled filter configurations discussed below.

In pixel array 105 a color can be assigned to each pixel using a color filter array ("CFA") coupled to the pixel array. CFAs assign a separate primary color to each pixel by placing a filter of that primary color over the pixel. Thus, for example, it is common to refer to a pixel as a "clear pixel" if it has no filter or is coupled to a clear (i.e., colorless) filter, as a "blue pixel" if it is coupled to a blue filter, as a "green pixel" if it is coupled to a green filter, or as a "red pixel" if it is coupled to a red filter. As photons pass through a filter of a certain primary color to reach the pixel, only wavelengths that fall within the wavelength range of that primary color pass through. All other wavelengths are absorbed. In the illustrated embodiment, color pixel array 105 includes clear (i.e., colorless) pixels in addition to red (R), green (G) and blue (B) pixels.

After each pixel in pixel array 105 has acquired its image data or image charge, the image data is read out by readout circuitry 170 and transferred to function logic 115 for storage, additional processing, etc. Readout circuitry 170 can include amplification circuitry, analog-to-digital ("ADC") conversion circuitry, or other circuits. Function logic 115 can simply store the image data and/or manipulate the image data by applying post-image effects (e.g., crop, rotate, remove red eye, adjust brightness, adjust contrast, or otherwise). Function logic 115 can also be used in one embodiment to process the image data to correct (i.e., reduce or remove) fixed pattern noise. Control circuitry 120 is coupled to pixel array 105 to control operational characteristic of color pixel array 105. For example, control circuitry 120 can generate a shutter signal for controlling image acquisition.

Figure 2:
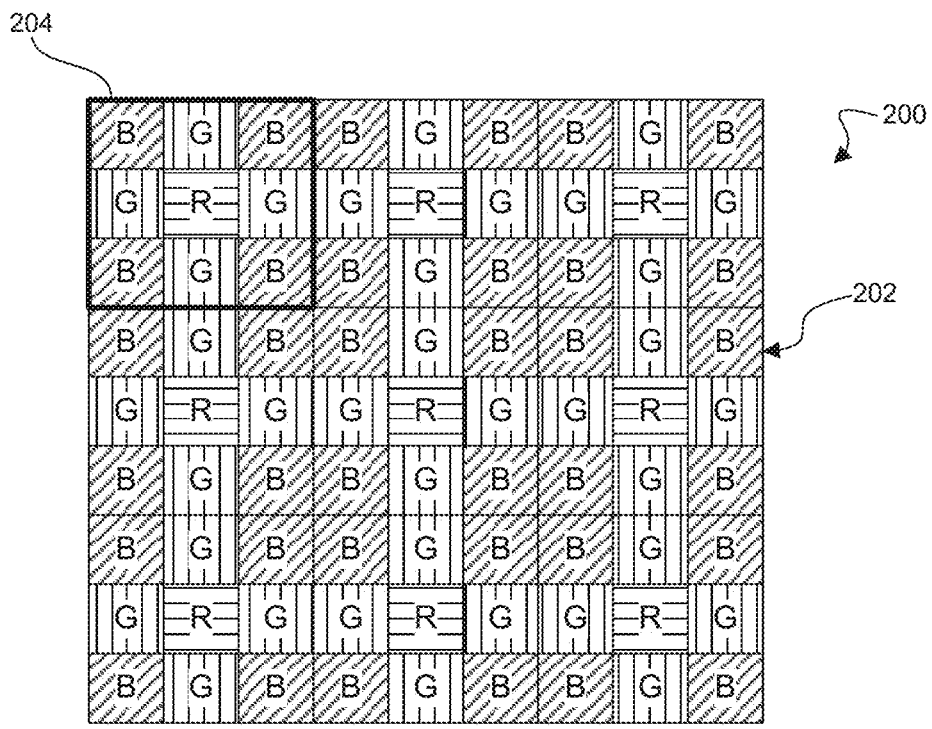
FIG. 2 is a plan view of an embodiment of a pixel array with a coupled color filter array.

FIG. 2 illustrates an embodiment of a pixel array 200 with a coupled color filter array (CFA) 202. CFA 202 includes a plurality of individual filters, and each individual filter has a particular photoresponse and is optically coupled to a corresponding individual pixel in the pixel array. Each pixel has a particular photoresponse that has high sensitivity to certain portions of the electromagnetic spectrum while simultaneously having low sensitivity to other portions of the spectrum. The term color pixel will refer to a pixel having a color photoresponse.

The set of color photoresponses selected for use in a CFA usually has three colors, as shown in the Bayer CFA, but it can also include four or more. As used herein, a clear or panchromatic photoresponse refers to a photoresponse having a wider spectral sensitivity than those spectral sensitivities represented in the selected set of color photoresponses. A panchromatic photosensitivity can have high sensitivity across the entire visible spectrum. The term panchromatic pixel refers to a pixel having a panchromatic photoresponse. Although panchromatic pixels generally have a wider spectral sensitivity than the set of color photoresponses, each panchromatic pixel can have an associated filter. Such filter is either a neutral density filter or a colorless filter.

The individual filters in CFA 202 are arrayed in a pattern formed by tiling together a plurality of minimal repeating units (MRU) such as MRU 204. A minimal repeating unit is a repeating unit such that no other repeating unit has fewer individual filters. A given color filter array can include several different repeating units, but a repeating unit is not a minimal repeating unit if there is another repeating unit in the array that includes fewer individual filters.

Figure 3:
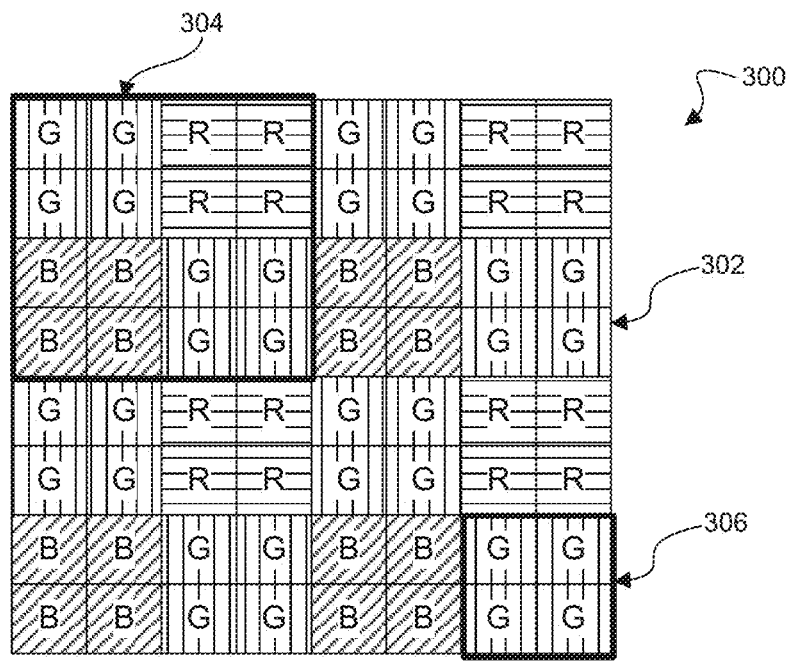
FIG. 3 is a plan view of another embodiment of a pixel array with a coupled color filter array.

FIG. 3 illustrates an embodiment of an image sensor 300 coupled to a color filter array (CFA) 302. CFA 302 includes scaled filters 306. A scaled filter is contiguous single filter of a single photoresponse, or a group of filters of a single photoresponse, that can be optically coupled to an M×N block of contiguous individual pixels. Scaled filter 306 is an example of a four-pixel scaled filter, as it can be optically coupled to a 2×2 block of individual pixels.

The illustrated embodiment is a green scaled filter, but of course other embodiments of scaled filters can be colors other than green. As in CFA 202, CFA 302 includes a plurality of tiled minimum repeating units 304. But in CFA 302 the minimal repeating unit 304 differs from MRU 204 in that the MRU 304 is made up of scaled filters 306 rather than individual filters. MRU 304, then, is a 2×2 MRU with four scaled filters. In the illustrated embodiment MRU 304 includes scaled filters with three different photoresponses—red (R), green (G), and blue (B), arranged in the well-known Bayer pattern—but other embodiments of MRU 304 can include scaled filters with additional or different photo responses in addition to, or instead of, R, G, and B. For instance, other embodiments can include cyan (C), magenta (M), and yellow (Y) filters, clear (i.e., panchromatic or colorless) filters, infrared filters, ultraviolet filters, x-ray filters, etc. Other embodiments of an MRU can include a greater or lesser number of scaled filters than illustrated for MRU 304 and need not be square as shown but can instead have different shapes such as rectangular.

Figure 4A:
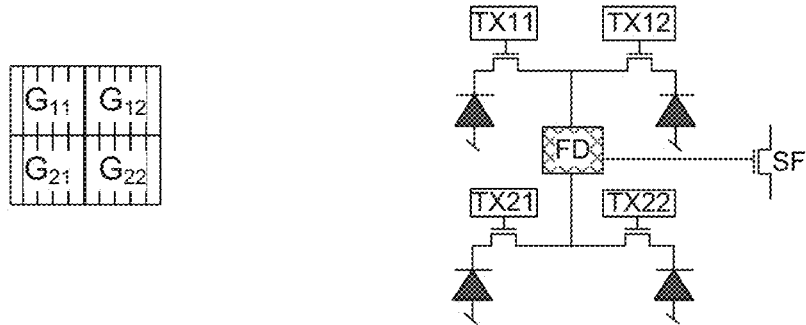
FIGS. 4A-4D are schematics of embodiments of pixel kernels (on the right) and plan views of corresponding scaled filters (on the left).
Figure 4B:
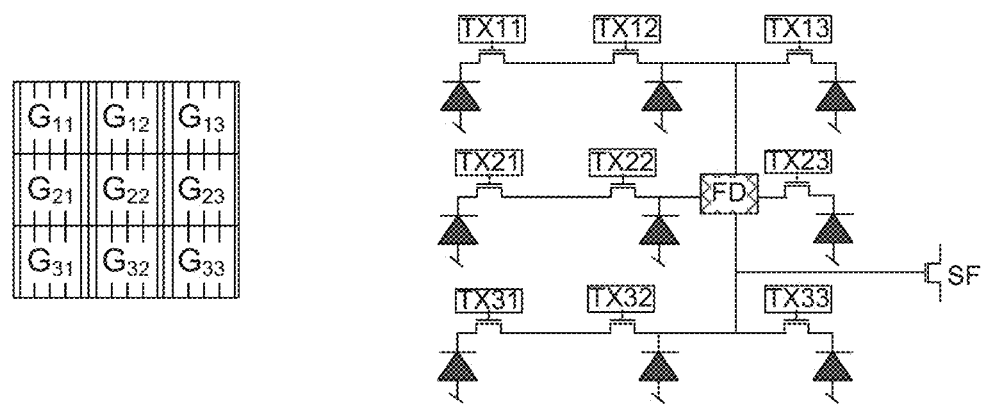
Figure 4C:
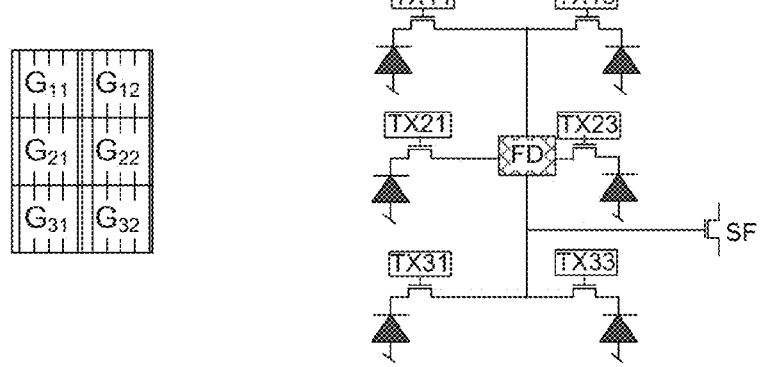
Figure 4D:
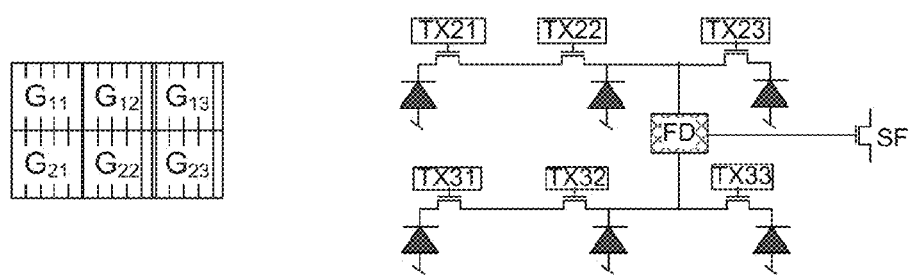

FIGS. 4A-4D illustrate embodiments of pixel kernels and corresponding scaled filters; in each figure, a schematic of the pixel kernels is on the right and the corresponding scaled filter on the left. A pixel kernel is an M×N group of two or more individual pixels that share a common component. In the embodiments of FIGS. 4A-4D, the pixel kernels share a common floating diffusion node (FD). All individual pixels in each kernel are coupled to the FD via transfer transistors TX, and each FD is additionally coupled to a source follower transistor SF that can be used to read the signal from the FD. By selectively activating and deactivating transfer transistors TX, charge accumulated in individual pixels during an integration period during which the pixels are exposed to light can be transferred to the FD, and the charge from the FD can be read out through source follower transistor SF. The primary difference between the embodiments shown in FIGS. 4A-4D is the size and shape of the pixel kernel: FIGS. 4A-4B illustrate M×N scaled filters that are square, meaning that for these filters M=N. FIGS. 4C-4D illustrate embodiments of scaled pixel kernels and scaled filters in which M≠N, meaning that these filters are not square, but rectangular. In the scaled filter of FIG. 4C, M is less than N, but in FIG. 4D M is greater than N.

The pixel kernels of FIGS. 4A-4D can be operated differently depending on the mode of operation of the image sensors in which they are located. In one mode, the charge from each individual pixel can be transferred to the FD one at a time and then be read by the SF transistor one a time, so that the pixels are read individually and the resulting image is a full resolution images incorporating information from every pixel in the array. In another mode, all the transfer transistors TX can be activated simultaneously or sequentially until the charge from all the individual pixels in the kernel has accumulated in the FD, so the signal from the entire pixel kernel is binned into the FD. The FD is then read out using the SF transistor, resulting in an image with higher sensitivity but lower resolution. In another mode, binning can take place a level less than the entire pixel kernel. For example, in FIG. 4A, charge from pixels G11 and G12 can be transferred to the FD, then read, effectively binning only these two pixels within the kernel. Following that, charge from pixels G21 and G22 can be transferred to the FD, then read, again binning only two pixels from the pixel kernel. This results in an image with resolution and sensitivity between the falls between the two previous modes. In other embodiments, other combinations of pixel binning within a kernel are also possible.

Figures 5A, 5B, 5C:
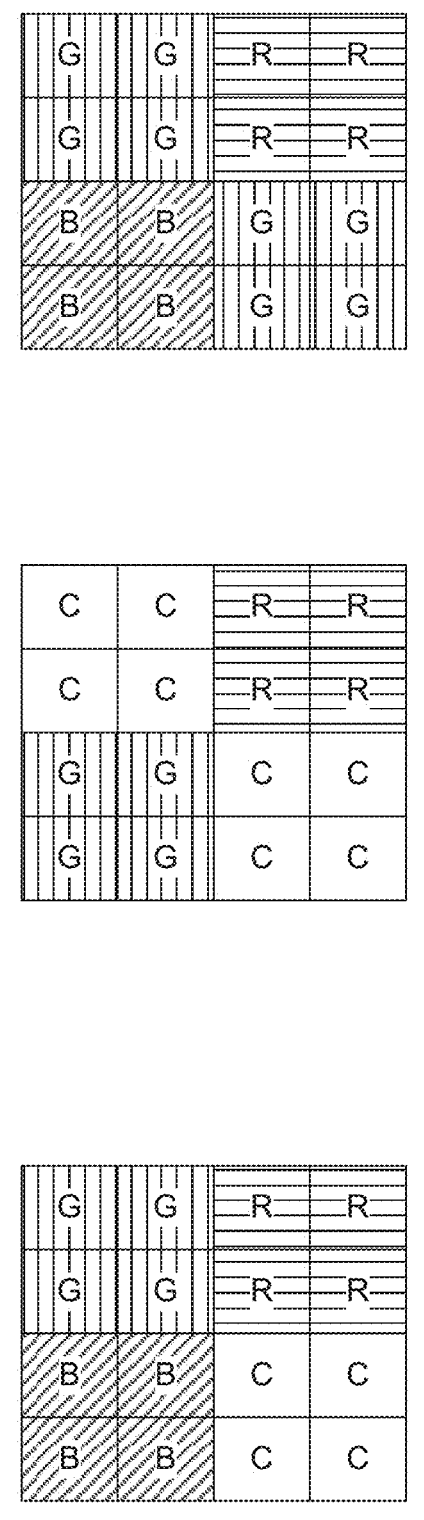

FIGS. 5A-5C illustrate embodiments of minimal repeating units (MRUs) using scaled filters with different combinations of photoresponses. All the illustrated MRU embodiments are square, but other embodiments of MRUs using the illustrated combinations of photoresponses need not be square. FIG. 5A illustrates an embodiment with four scaled filters, each scaled filter being a four-pixel (2×2) filter. In the MRU of FIG. 5A the scaled filters are positioned in a Bayer pattern, with scaled filters that have red, green, and blue photo responses. Other embodiments can of course include more or less scaled filters, and the scaled filters can be of different sizes.

FIG. 5B illustrates another embodiment of a MRU with four scaled filters, each scaled filter being a four-pixel (2×2) scaled filter. In the illustrated embodiments the scaled filters in the MRU include three different color responses: clear or panchromatic (i.e., colorless), red, and green. The clear scaled filters are positioned along the MRU's major diagonal (running from top left to bottom right), while the green and red scaled filters are positioned along the MRU's minor diagonal (running from bottom left to top right).

FIG. 5C illustrates another embodiment of an MRU with four scaled filters, each scaled filter being a four-pixel (2×2) scaled filter. In the illustrated embodiment the scaled filters in the MRU have four different photoresponses: clear or panchromatic (i.e., neutral or colorless), red, blue, and green. FIG. 5D illustrates another embodiment of an MRU with four scaled filters, each scaled filter being a four-pixel (2×2) scaled filter. In the illustrated embodiment the scaled filters in the MRU have three color responses: cyan, magenta, and yellow.

Figure 6:
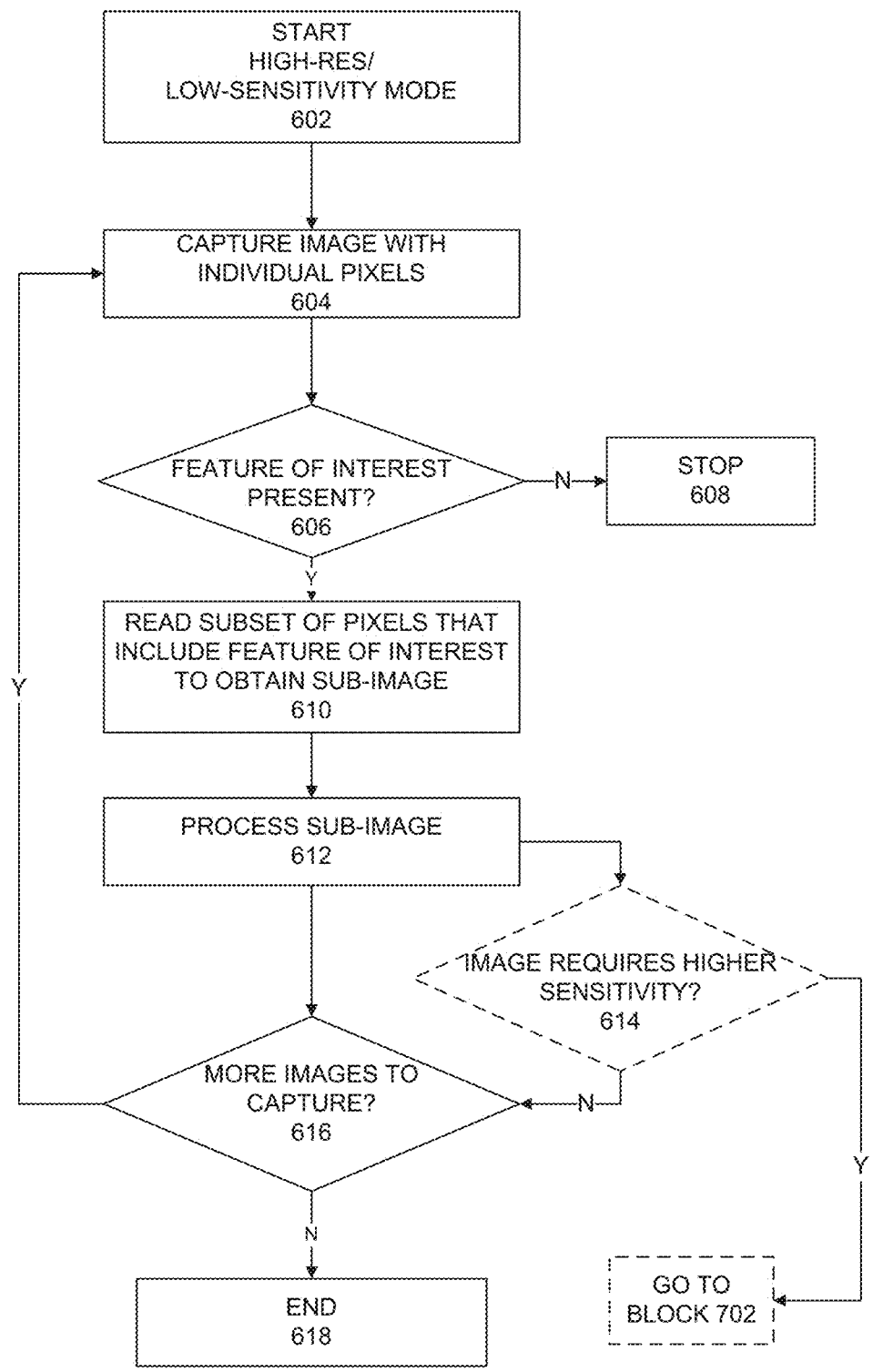
FIG. 6 is a flowchart illustrating an embodiment of a first mode of operation of an image sensor.

FIG. 6 is a flowchart of an embodiment of a first mode for operating an image sensor using any of the previously-described pixel kernels and CFAs. The first mode is a high-resolution, low-sensitivity mode. The process starts at block 602, where the image sensor is set to its high-resolution low-sensitivity mode and any necessary initialization takes place. At block 604, an image is captured with all the individual pixels in the pixel array.

Figure 7:
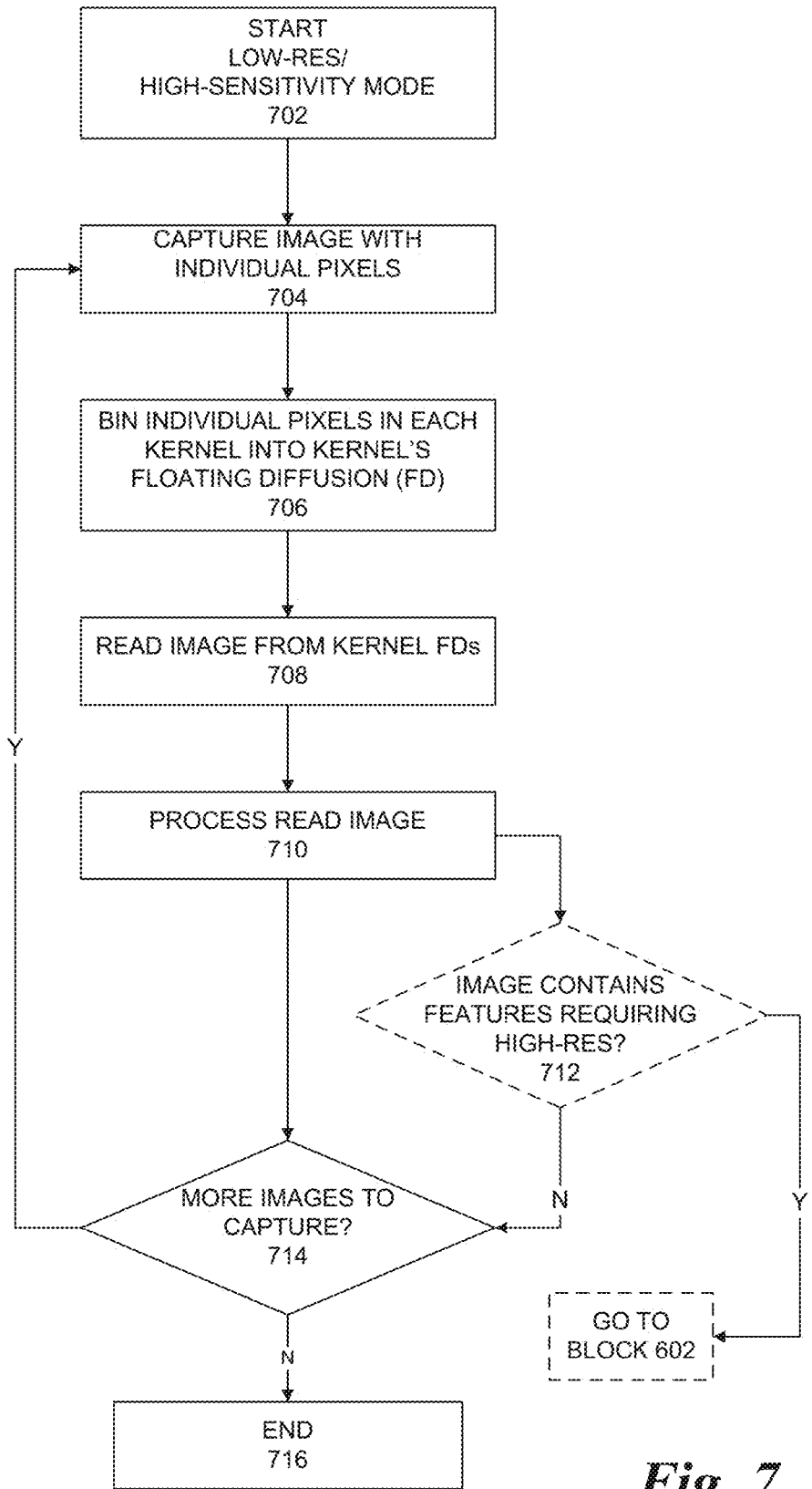
FIG. 7 is a flowchart of an embodiment of a second mode of operation for an image sensor.

At block 606 the process determines whether there are features in the image that require high resolution or decides whether such a determination has been made by the second mode, for example at block 712 (see FIG. 7). If at block 606 no image feature has been identified that requires a high-resolution sub-image, the process stops at block 608. But if at block 606 an image feature has been identified that does require a high-resolution sub-image the process continues on from block 606 to block 610.

Figure 8A:
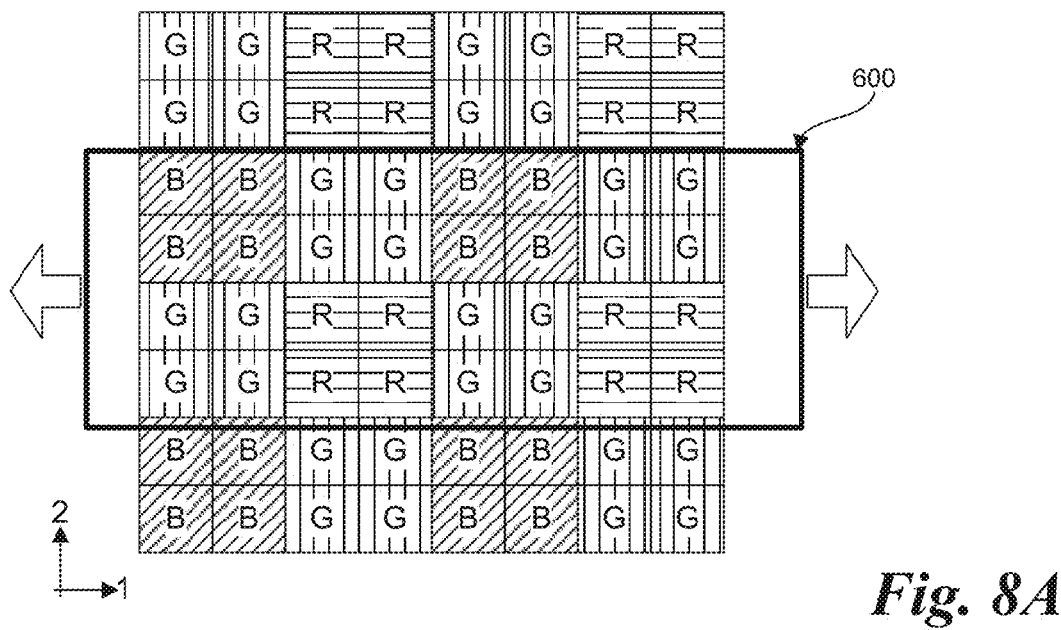
FIGS. 8A-8C are plan views of embodiments of pixel subsets that can be used in embodiments of the second mode of operation of an image sensor.
Figure 8B:
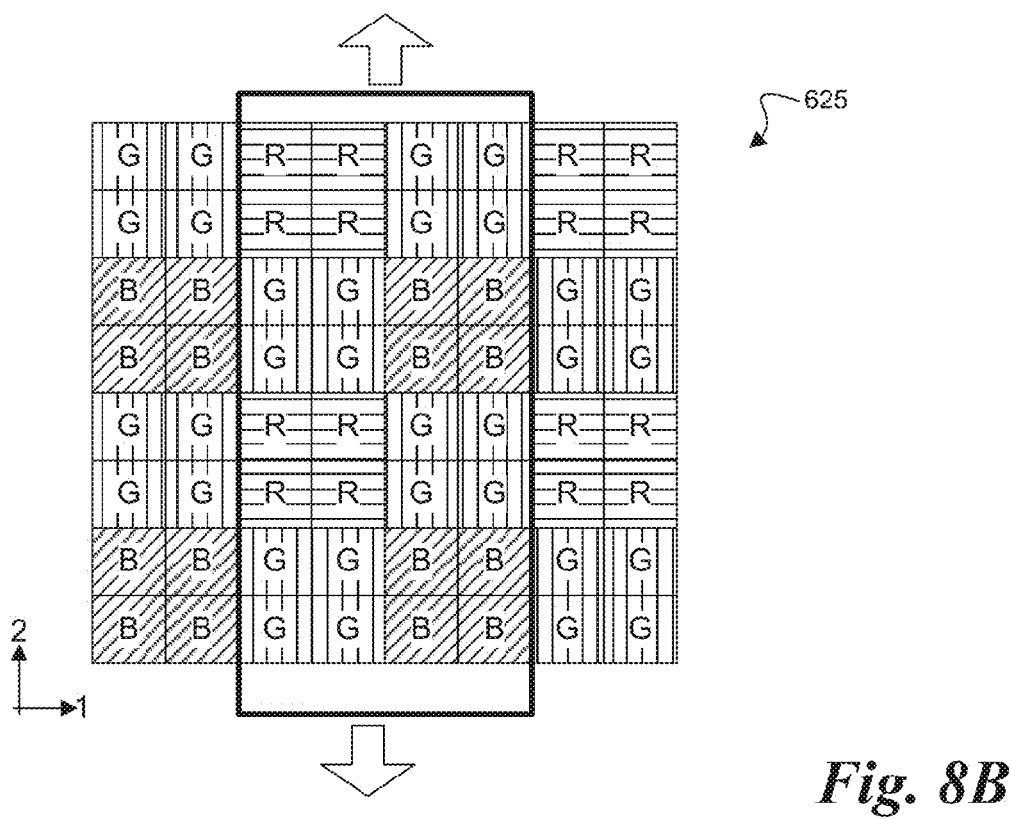
Figure 8C:
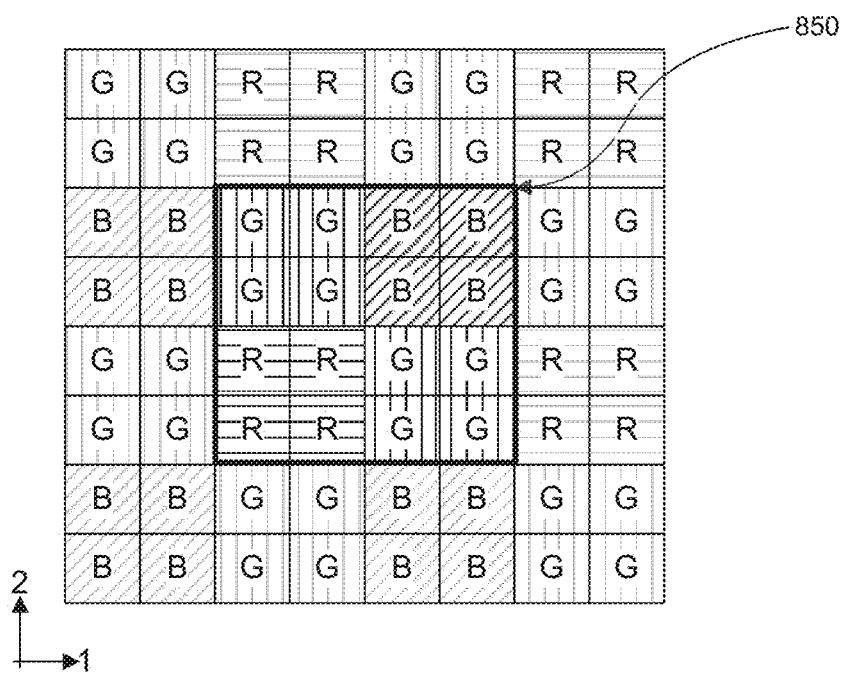

At block 610, the process reads a subset of the pixels that include the feature of interest that requires a high-resolution sub-image. In different embodiments, the subset of pixels that is read to form the sub-image can have different shapes, as shown in FIGS. 8A-8C. For instance, in FIG. 8A the subset of pixels can be a strip of pixels that extends over an entire first dimension of the pixel array but over less than an entire second dimension of the pixel array. In FIG. 8B, the subset of pixels can be a strip of pixels that extends over an entire second dimension of the pixel array but over less than an entire first dimension. In FIG. 8C the subset of pixels is a block of pixels that extends less than both the first and second dimensions of the pixel array. Having read the appropriate subset of pixels, the sub-image represented by the subset of pixels can be processed at block 612.

After processing the sub-image at block 612, the process continues to block 614, which is optional as indicated by its dashed outline. After processing at block 612, at block 614 the sub-image can be examined to see if more light sensitivity is needed. If at block 614 there is a determination that more light sensitivity is needed, then the process can invoke the second mode by proceeding to block 702 in FIG. 7. If at block 614 more light sensitivity is not needed, the process proceeds to block 616, where it determines whether more images remain to be captured. If at block 616 there are more images to be captured, the process returns to block 604. If at block 614 there are no more images to capture, the process ends at block 618.

FIG. 7 illustrates an embodiment of a second mode for operating an image sensor using any of the previously-described pixel kernels and CFAs. The second mode is a low-resolution/high-sensitivity mode. At block 702, the image sensor is set to the first mode and any initialization is carried out. At block 704 all the individual pixels in the pixel array are exposed to light during an integration period so that each has accumulated charge, and thus a pixel signal, at the end of the integration period.

At block 706, individual pixels within each pixel kernel are binned into the kernel's floating diffusion (FD); as discussed above, all or less than all individual pixels in each kernel can be binned into the kernel's floating diffusion. At block 708, signal is read from each kernel FD, and at block 710 the image read from all the kernel FDs is processed. At block 712, which is optional as indicated by its dashed outline, after processing at block 710 the image can be examined to see if it contains features on which to zoom in—that is, features for which it might be desirable to obtain a high-resolution sub-image. If at block 712 there are features in the image that require a higher resolution sub-image, then the process can invoke the first mode by proceeding to block 702 in FIG. 7. If at block 712 no feature is found in the low-resolution image that requires a high-resolution sub-image, the process proceeds to block 714, where it determines whether more images remain to be captured. If at block 714 there are more images to be captured, the process returns to block 704. If at block 714 no more images remain to capture, the process ends at block 716.

Although the high-resolution/low-sensitivity mode is described above as a "first mode" and the low-resolution/high-sensitivity mode is described as a "second mode," this merely indicates that the modes are different, not that they must be executed in this order. The execution order of the first and second modes is fully reversible. In one embodiment the first mode can be executed first, followed by the second mode, but in other embodiments the second mode can be executed first, followed by the first mode. In still other embodiments there need not be any mode switching: operation can be entirely in the first mode or entirely in the second mode. In each case the other mode is available if needed or wanted, but need not be executed if not needed or wanted.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
a pixel array including a plurality of individual pixels grouped into pixel kernels having two or more individual pixels, wherein each pixel kernel includes a floating diffusion that is electrically coupled to all individual pixels in the kernel;
a color filter array positioned over and optically coupled to the pixel array, the color filter array comprising a plurality of tiled minimal repeating units, each minimal repeating unit including a plurality of scaled filters, each scaled filter having a photoresponse selected from among two or more different photoresponses, wherein the individual pixels within each pixel kernel are optically coupled to a corresponding scaled filter; and
circuitry and logic coupled to the pixel array to cause the apparatus to operate in multiple image-capture modes, including:
a first mode wherein signals from individual pixels within the pixel array are individually transferred to their floating diffusion and read, resulting in a high-resolution, low-sensitivity image, and a second mode wherein signals from all individual pixels in a pixel kernel are binned into the floating diffusion of the kernel and read, resulting in a low-resolution, high-sensitivity image;

wherein the circuitry and logic further operate the first mode and the second mode in a first sequence or a second sequence, the first sequence comprising:

using the first mode to capture the high-resolution, low-sensitivity image, identifying a feature of interest in the high-resolution, low-sensitivity image, processing only a subset of pixels from the high-resolution, low-sensitivity image that include at least the feature of interest to create a high-resolution, low-sensitivity sub-image, and using the second mode to capture a low-resolution, high-sensitivity sub-image of the subset of pixels that include at least the feature of interest.

2. The apparatus of claim 1 wherein each pixel kernel includes M×N pixels and wherein M, N, or both, are greater than 1.

3. The apparatus of claim 2 wherein M equals N or wherein M does not equal N.

4. The apparatus of claim 2 wherein each scaled filter is optically coupled to M×N pixels.

5. The apparatus of claim 1 wherein the minimal repeating unit is:

| G | R |
| B | G | wherein
G represents a scaled filter with a green photoresponse,
B represents a scaled filter with a blue photoresponse, and
R represents a scaled filter with a red photoresponse.

6. The apparatus of claim 1 wherein the minimal repeating unit is:

| C | R |
| G | C | wherein
G represents a scaled filter with a green photoresponse,
C represents a scaled filter with a colorless photoresponse, and
R represents a scaled filter with a red photoresponse.

7. The apparatus of claim 1 wherein the minimal repeating unit is:

| G | R |
| B | C | wherein
G represents a scaled filter with a green photoresponse,
B represents a scaled filter with a blue photoresponse,
R represents a scaled filter with a red photoresponse, and
C represents a scaled filter with a colorless photoresponse.

8. The apparatus of claim 1 wherein the minimal repeating unit is:

| C | Y |
| Y | M | wherein
G represents a scaled filter with a green photoresponse,
C represents a scaled filter with a colorless photoresponse, and
R represents a scaled filter with a red photoresponse.

9. The apparatus of claim 1 wherein the pixel array has a first dimension and a second dimension, and wherein the subset pixels comprises a strip of pixels extending the entire first dimension of the pixel array but less than the entire second dimension.

10. The apparatus of claim 1 wherein each scaled filter is a contiguous filter optically coupled to the pixels in a corresponding pixel kernel.

11. The apparatus of claim 1 wherein the first mode is executed before the second mode.

12. The apparatus of claim 1 wherein only one of the first mode and the second mode is executed.

13. A process comprising:
in an image sensor including:
a pixel array including a plurality of individual pixels grouped into pixel kernels having two or more individual pixels, wherein each pixel kernel includes a floating diffusion that is electrically coupled to all individual pixels in the kernel, and
a color filter array positioned over and optically coupled to the pixel array, the color filter array comprising a plurality of tiled minimal repeating units, each minimal repeating unit including scaled filters, each scaled filter having a photoresponse selected from among two or more photoresponses, wherein the individual pixels within each pixel kernel are optically coupled to a corresponding scaled filter, programming circuitry and logic coupled to the pixel array to cause the image sensor, when operated, to include multiple image-capture modes, including:
a first mode wherein signals from individual pixels within the pixel array are individually transferred to their floating diffusion and read, resulting in a high-resolution, low-sensitivity image, and
a second mode wherein signals from all individual pixels in every pixel kernel are binned into the floating diffusion of the kernel and read, resulting in a low-resolution, high-sensitivity image;

wherein the circuitry and logic are further programmed to operate the first mode and the second mode in a first sequence or a second sequence, the first sequence comprising:
using the first mode to capture the high-resolution, low-sensitivity image,
identifying a feature of interest in the high-resolution, low-sensitivity image,
processing only a subset of pixels from the high-resolution, low-sensitivity image that include at least the feature of interest to create a high-resolution, low-sensitivity sub-image, and
using the second mode to capture a low-resolution, high-sensitivity sub-image of the subset of pixels that include at least the feature of interest.

14. The process of claim 13 wherein each pixel kernel includes M×N pixels and wherein M, N, or both, are greater than 1.

15. The process of claim 14 wherein M equals N or wherein M does not equal N.

16. The process of claim 14 wherein each scaled filter is optically coupled to M×N pixels.

17. The process of claim 13 wherein the minimal repeating unit is:

| G | R |
|---|---|
| B | G | wherein
G represents a scaled filter with a green photoresponse,
B represents a scaled filter with a blue photoresponse, and
R represents a scaled filter with a red photoresponse.

18. The process of claim 13 wherein the minimal repeating unit is:

| C | R |
|---|---|
| G | C | wherein
G represents a scaled filter with a green photoresponse,
C represents a scaled filter with a colorless photoresponse, and
R represents a scaled filter with a red photoresponse.

19. The process of claim 13 wherein the minimal repeating unit is:

| G | R |
|---|---|
| B | C | wherein
G represents a scaled filter with a green photoresponse,
B represents a scaled filter with a blue photoresponse,
R represents a scaled filter with a red photoresponse, and
C represents a scaled filter with a colorless photoresponse.

20. The process of claim 13 wherein the minimal repeating unit is:

| C | Y |
|---|---|
| Y | M | wherein
G represents a scaled filter with a green photoresponse,
C represents a scaled filter with a colorless photoresponse, and
R represents a scaled filter with a red photoresponse.

21. The process of claim 13 wherein the pixel array has a first dimension and a second dimension, and wherein the subset pixels comprises a strip of pixels extending the entire first dimension of the pixel array but less than the entire second dimension.

22. The process of claim 13 wherein each scaled filter is a contiguous filter optically coupled to the pixels in a corresponding pixel kernel.

23. The process of claim 13 wherein the first mode is executed before the second mode.

24. The process of claim 13 wherein only one of the first mode and the second mode is executed.

25. The apparatus of claim 1 wherein second sequence comprises:
using the second mode to capture the low-resolution, high-sensitivity image,
processing the low-resolution, high-sensitivity image to identify a feature of interest in the low-resolution, high-sensitivity image, and
invoking the first sequence if the feature of interest requires a high-resolution image.

26. The process of claim 13 wherein second sequence comprises:
using the second mode to capture the low-resolution, high-sensitivity image,
processing the low-resolution, high-sensitivity image to identify a feature of interest in the low-resolution, high-sensitivity image, and
invoking the first sequence if the feature of interest requires a high-resolution image.

* * * * *